United States Patent
Mikashima et al.

(10) Patent No.: US 10,800,164 B2
(45) Date of Patent: Oct. 13, 2020

(54) RECORDING HEAD UNIT AND INKJET RECORDING APPARATUS

(71) Applicant: KYOCERA Document Solutions Inc., Osaka-shi, Osaka (JP)

(72) Inventors: Katsuo Mikashima, Osaka (JP); Kenichi Satake, Osaka (JP)

(73) Assignee: KYOCERA Document Solutions Inc., Osaka-shi, Osaka (JP)

(*) Notice: Subject to any disclaimer, the term of this patent is extended or adjusted under 35 U.S.C. 154(b) by 0 days.

(21) Appl. No.: 16/374,540

(22) Filed: Apr. 3, 2019

(65) Prior Publication Data
US 2019/0308410 A1 Oct. 10, 2019

(30) Foreign Application Priority Data
Apr. 4, 2018 (JP) .................. 2018-072019

(51) Int. Cl.
*B41J 2/045* (2006.01)
*G06K 15/10* (2006.01)

(52) U.S. Cl.
CPC ......... *B41J 2/04508* (2013.01); *B41J 2/0458* (2013.01); *B41J 2/04541* (2013.01); *B41J 2/04563* (2013.01); *B41J 2/04581* (2013.01); *G06K 15/107* (2013.01); *B41J 2202/20* (2013.01); *B41J 2202/21* (2013.01)

(58) Field of Classification Search
CPC .. B41J 2/04508; B41J 2/04563; B41J 2/0458; B41J 2/04581; B41J 2/04541; B41J 2202/20; B41J 2202/21; G06K 15/107
See application file for complete search history.

(56) References Cited

U.S. PATENT DOCUMENTS

| | | | | |
|---|---|---|---|---|
| 6,072,513 | A | * | 6/2000 | Agano .............. B41J 2/52 347/183 |
| 6,312,078 | B1 | * | 11/2001 | Wen ............... B41J 2/0458 347/12 |
| 2008/0150994 | A1 | * | 6/2008 | Geer .............. B41J 2/04513 347/19 |

(Continued)

FOREIGN PATENT DOCUMENTS

JP 2004228654 A 8/2004

*Primary Examiner* — Justin Seo
(74) *Attorney, Agent, or Firm* — Alleman Hall Creasman & Tuttle LLP

(57) ABSTRACT

A first storage portion stores, in advance, first reference voltage values respectively for ink ejection portions, the first reference voltage values corresponding to a predetermined first image density value. A second storage portion stores, in advance, voltage values that are different from each other, and measurement values that indicate image densities respectively corresponding to the voltage values. A voltage value calculating portion, at a predetermined change timing for changing image density, calculates second reference voltage values respectively for the ink ejection portions based on the voltage values and the measurement values, the second reference voltage values corresponding to a second image density value that is different from the first image density value. A voltage switching portion switches driving voltages that are applied to the ink ejection portions, from driving voltages having the first reference voltage values to driving voltages having the second reference voltage values.

12 Claims, 15 Drawing Sheets

(56) References Cited

U.S. PATENT DOCUMENTS

| | | | |
|---|---|---|---|
| 2013/0038657 A1* | 2/2013 | Viturro | B41J 2/0459 |
| | | | 347/19 |
| 2015/0154477 A1* | 6/2015 | Yoo | B41J 29/393 |
| | | | 358/1.9 |
| 2019/0126609 A1* | 5/2019 | Mizutani | H04N 1/6041 |

* cited by examiner

RECORDING HEAD UNIT AND INKJET RECORDING APPARATUS

INCORPORATION BY REFERENCE

This application is based upon and claims the benefit of priority from the corresponding Japanese Patent Application No. 2018-072019 filed on Apr. 4, 2018, the entire contents of which are incorporated herein by reference.

BACKGROUND

The present disclosure relates to a recording head unit for recording an image by ejecting ink droplets onto a sheet, and to an inkjet recording apparatus.

An inkjet recording apparatus includes a recording head unit including a plurality of piezoelectric elements, wherein the piezoelectric elements are expanded or contracted when driving voltages are applied thereto from a driving voltage generating portion, thereby ink droplets are ejected from a plurality of ink ejection portions toward a sheet.

SUMMARY

A recording head unit according to an aspect of the present disclosure includes a plurality of ink ejection portions, a first storage portion, a second storage portion, a voltage value calculating portion, and a voltage switching portion. The plurality of ink ejection portions each eject ink droplets based on a driving voltage. The first storage portion stores, in advance, a plurality of first reference voltage values respectively for the plurality of ink ejection portions, the plurality of first reference voltage values corresponding to a predetermined first image density value. The second storage portion stores, in advance, a plurality of voltage values that are different from each other, and a plurality of measurement values that indicate image densities respectively corresponding to the plurality of voltage values. The voltage value calculating portion, at a predetermined change timing for changing image density, calculates a plurality of second reference voltage values respectively for the plurality of ink ejection portions based on the plurality of voltage values and the plurality of measurement values, the plurality of second reference voltage values corresponding to a second image density value that is different from the first image density value. The voltage switching portion switches driving voltages that are applied to the ink ejection portions, from driving voltages having the first reference voltage values to driving voltages having the second reference voltage values.

An inkjet recording apparatus according to another aspect of the present disclosure includes a plurality of ink ejection portions, a first storage portion, a second storage portion, a voltage value calculating portion, and a voltage switching portion. The plurality of ink ejection portions each eject ink droplets based on a driving voltage. The first storage portion stores, in advance, a plurality of first reference voltage values respectively for the plurality of ink ejection portions, the plurality of first reference voltage values corresponding to a predetermined first image density value. The second storage portion stores, in advance, a plurality of voltage values that are different from each other, and a plurality of measurement values that indicate image densities respectively corresponding to the plurality of voltage values. The voltage value calculating portion, at a predetermined change timing for changing image density, calculates a plurality of second reference voltage values respectively for the plurality of ink ejection portions based on the plurality of voltage values and the plurality of measurement values, the plurality of second reference voltage values corresponding to a second image density value that is different from the first image density value. The voltage switching portion switches driving voltages that are applied to the ink ejection portions, from driving voltages having the first reference voltage values to driving voltages having the second reference voltage values.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment and modifications of the present disclosure with reference to the accompanying drawings, for the understanding of the present disclosure. It should be noted that the following embodiment is an example of a specific embodiment of the present disclosure and should not limit the technical scope of the present disclosure.

Embodiment

Figure 1:
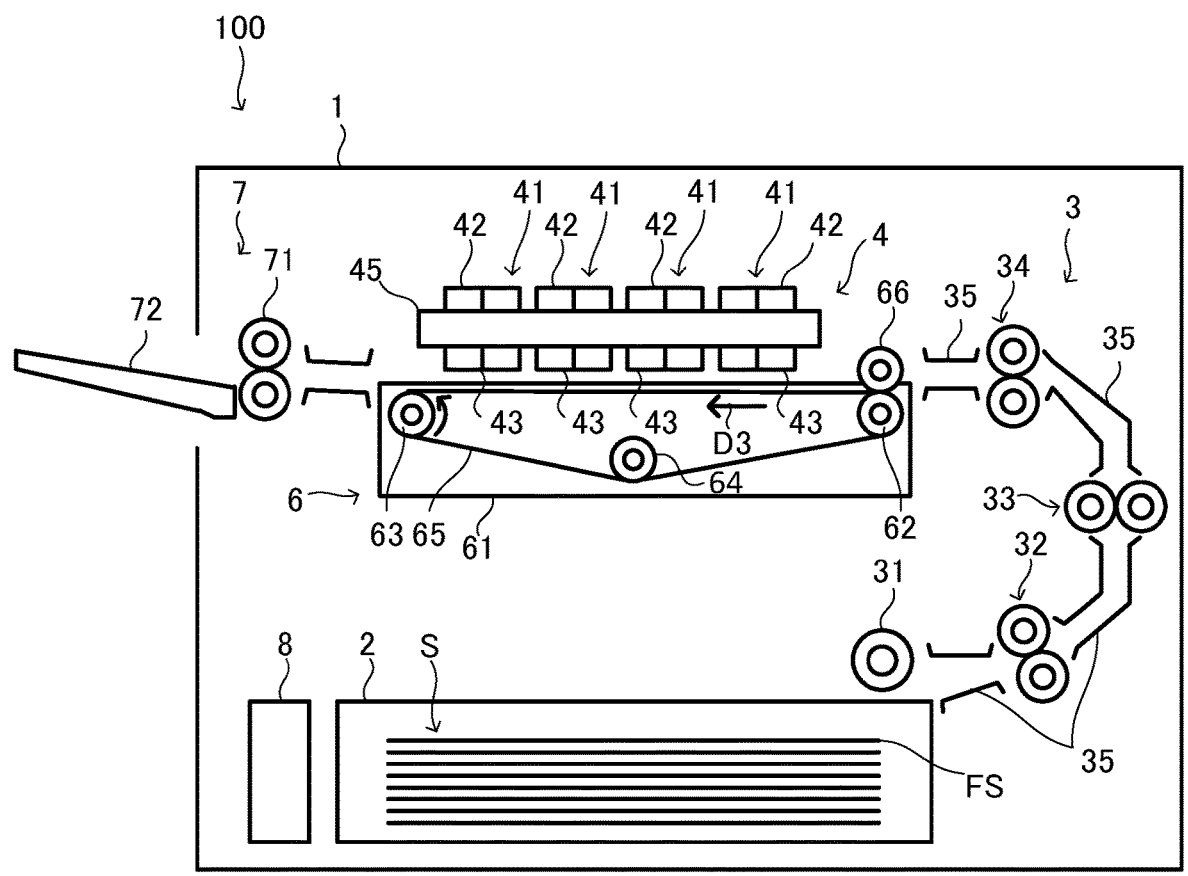
FIG. 1 is a schematic diagram showing a configuration of an inkjet recording apparatus according to an embodiment of the present disclosure.
Figure 1:
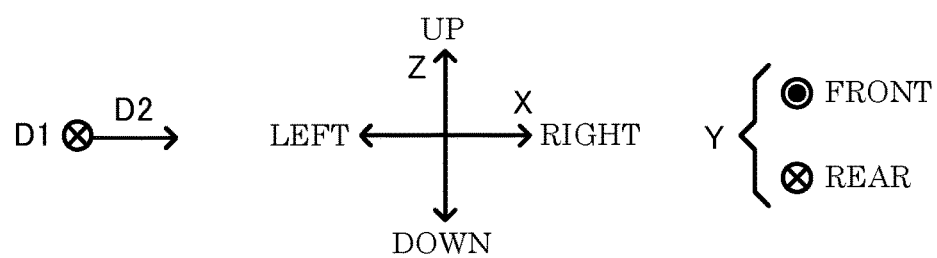

In FIG. 1, arrows X, Y and Z respectively indicate a left-right direction, a front-rear direction and an up-down direction of an inkjet recording apparatus 100. In addition, a main scanning direction D1 is directed from the front side toward the rear side of the inkjet recording apparatus 100, and a sub scanning direction D2 is directed from the left side toward the right side of the inkjet recording apparatus 100. The main scanning direction D1 and the sub scanning direction D2 are orthogonal to each other.

In FIG. 1, the inkjet recording apparatus 100 is a copier, a printer, a facsimile apparatus, or a multifunction peripheral. The multifunction peripheral has a plurality of functions such as a copy function, a print function, and a facsimile function.

In the present embodiment, the inkjet recording apparatus 100 is an inkjet printer for generating a print by an inkjet method of recording an image on a sheet S with ink based on image data. The image data is transmitted from an information processing apparatus (a personal computer or the like) to the inkjet recording apparatus 100 via data communication.

The inkjet recording apparatus 100 includes a housing 1, a sheet storage portion 2, a feeding portion 3, an image recording portion 4, a conveyance portion 6, a discharge portion 7, and a control portion 8.

The housing 1 includes an exterior body and frame of the inkjet recording apparatus 100. The housing 1 stores the sheet storage portion 2, the feeding portion 3, the image recording portion 4, the conveyance portion 6, and the control portion 8.

The sheet storage portion 2 is, for example, a cassette. The sheet storage portion 2 is provided in a lower part of the housing 1. Sheets S of two or more sizes can be stored in the sheet storage portion 2. The sheets S have rectangular shapes. The sheets S are stored such that a first side S1 is parallel to the main scanning direction D1. In the following, the maximum value of the length of the first side S1 of the sheets S is referred to as a maximum side length.

The feeding portion 3 includes a pick-up roller 31, a separation roller pair 32, a conveyance roller pair 33, a registration roller pair 34, and a plurality of guide portions 35.

The pick-up roller 31, the separation roller pair 32, the conveyance roller pair 33, the registration roller pair 34, and the guide portions 35 which each have a shape whose length in the main scanning direction D1 is larger than the maximum side length, form a conveyance path along which the sheet S is conveyed from the sheet storage portion 2 to the conveyance portion 6. Rollers included in the pick-up roller 31, the separation roller pair 32, the conveyance roller pair 33, and the registration roller pair 34 each have a cylindrical shape and rotate under control of the control portion 8.

In the feeding portion 3, the pick-up roller 31 picks up sheets S from the sheet storage portion 2 one by one and feeds them to the conveyance path; the separation roller pair 32 and the conveyance roller pair 33, while rotating, guide the sheets S in sequence to the registration roller pair 34 that is provided in an upper part of the sheet storage portion 2; and the registration roller pair 34, while rotating, feeds the sheets S from the exit of the conveyance path to the conveyance portion 6.

The conveyance portion 6 is provided separately above the sheet storage portion 2 in the housing 1, on the left side of the exit of the conveyance path. The conveyance portion 6 includes a frame 61, a tension roller 62, a driving roller 63, an auxiliary roller 64, a conveyance belt 65, and a suction roller 66.

The tension roller 62, the driving roller 63, the auxiliary roller 64, and the suction roller 66 each have a cylindrical shape whose length in the main scanning direction D1 is larger than the maximum side length.

The tension roller 62 is provided in the frame 61, separately on the left side of the registration roller pair 34. The driving roller 63 is provided in the frame 61, separately on the left side of the tension roller 62. The upper end positions of the tension roller 62 and the driving roller 63 approximately match a position of a nip formed between the rollers of the registration roller pair 34 in the up-down direction.

The auxiliary roller 64, in the frame 61, is disposed at a position that is lower than and between the tension roller 62 and the driving roller 63.

The conveyance belt 65 is an endless belt, and has a width in the main scanning direction D1 that is larger than the maximum side length. The conveyance belt 65 is stretched between the tension roller 62, the driving roller 63, and the auxiliary roller 64. The conveyance belt 65 has a large number of through holes (not shown) all over the area in the circumferential direction, wherein the through holes pass through the belt from the outer peripheral surface side to the inner peripheral surface side.

The driving roller 63 rotates under control of the control portion 8. The tension roller 62 and the auxiliary roller 64 rotate following the rotation of the driving roller 63. This allows the conveyance belt 65 to run in a running direction D3 between the upper ends of the tension roller 62 and the driving roller 63. The running direction D3 is opposite to the sub scanning direction D2.

The suction roller 66 faces the tension roller 62 across the conveyance belt 65, and abuts on the outer peripheral surface of the conveyance belt 65 from above. The sheet S is fed between the suction roller 66 and the conveyance belt 65 by the feeding portion 3. The suction roller 66 presses the sheet S against the outer peripheral surface of the conveyance belt 65 to feed the sheet S toward the downstream side in the running direction D3. The sheet S comes in close contact with the outer peripheral surface of the conveyance belt 65 when a suction portion (not shown) sucks air through the through holes of the conveyance belt 65. The sheet S is conveyed from the suction roller 66 to the downstream side in the running direction D3 in a state where the sheet S is in close contact with outer peripheral surface. It is noted that the suction portion may cause the sheet S to come in close contact with the conveyance belt 65 electrostatically.

The image recording portion 4 includes a plurality of head units 41 that respectively correspond to a plurality of predetermined colors. The colors are yellow, black, cyan, and magenta. It is noted that the number of colors is not limited to four, but may be one or more. In addition, for convenience of explanation, color numbers 4, 3, 2, and 1 are respectively assigned to yellow, black, cyan, and magenta. The color numbers are represented by i (namely, i=1, 2, 3, 4).

The length of each of the head units 41 in the main scanning direction D1 is larger than the maximum side length. The head units 41 are provided in the housing 1 in a state of being supported by a holder 45. Specifically, the head units 41 are disposed at a position separated by a predetermined distance above from the outer peripheral surface of the conveyance belt 65. The head units 41 are arranged at intervals in alignment in the sub scanning direction D2 in the housing 1. In the present embodiment, the head units 41 for yellow, black, cyan, and magenta are arranged in alignment in the stated order from left to right.

Figure 2:
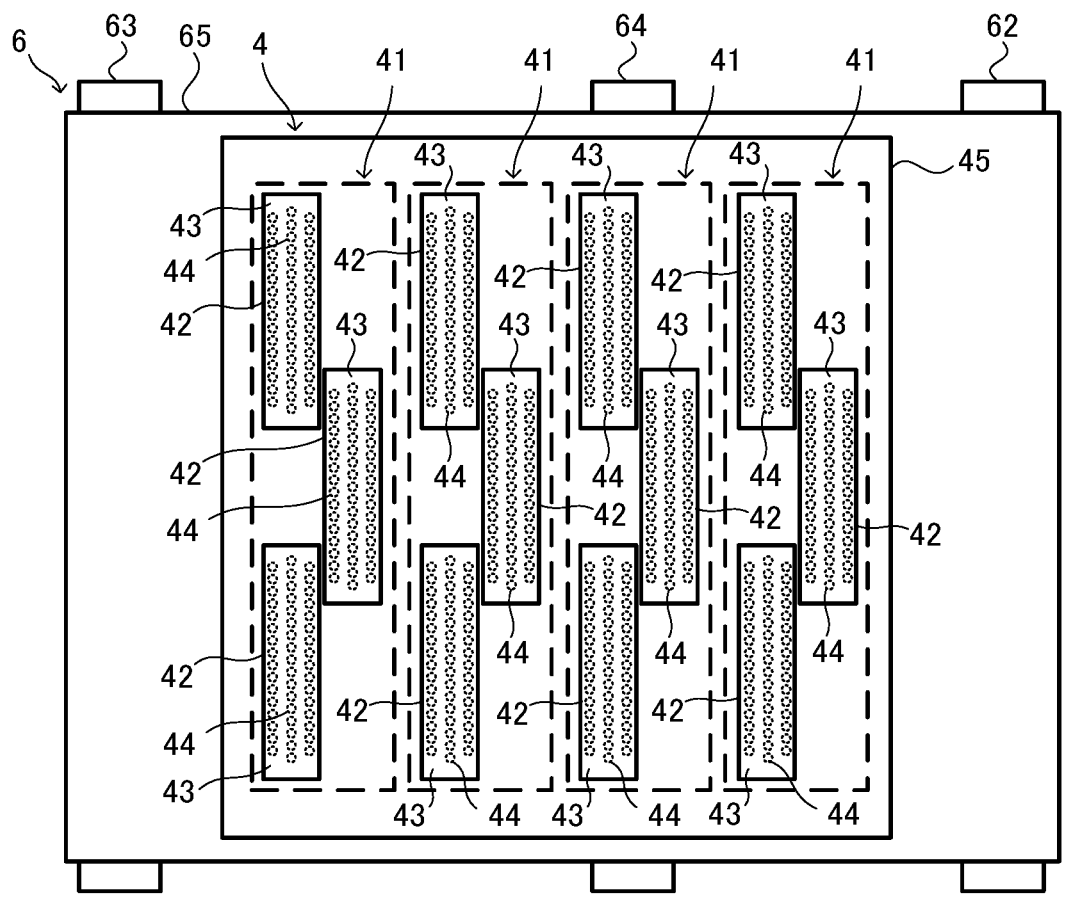
FIG. 2 is a schematic diagram showing ink ejection portions provided in recording heads shown in FIG. 1.
Figure 2:
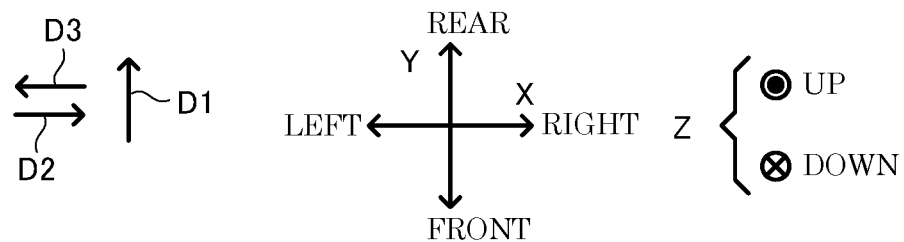

As shown in FIG. 2, each of the head units 41 includes a plurality of (in this example, three) recording heads 42. More specifically, each of the head units 41 includes three recording heads 42 aligned in the main scanning direction D1. Here, for convenience of explanation, head numbers 1, 2, and 3 are respectively assigned to a recording head 42 on the front side, a recording head 42 in the middle, and a recording head 42 on the depth side. The head numbers 1, 2, and 3 are represented by j (namely, j=1, 2, 3).

The recording heads 42 respectively have facing surfaces 43 that face the outer peripheral surface of the conveyance belt 65 from above (see FIG. 1). Each of the facing surfaces 43 has a large number of ink ejection portions 44 that respectively have ink ejection openings (see FIG. 2). Specifically, in each of the facing surfaces 43, a large number of ink ejection openings are arranged in the main scanning direction D1 and in the sub scanning direction D2.

As shown in FIG. 2, the recording heads 42 are of a so-called piezo-type. Each of the recording heads 42 includes a plurality of pressurizing chambers (not shown), a plurality of piezoelectric elements 48 (see FIG. 4), and a plurality of ink flow passages (not shown), wherein the pressurizing chambers respectively correspond to the ink ejection portions 44, the piezoelectric elements 48 are provided in correspondence with the pressurizing chambers, and the ink flow passages are communicated with the pressurizing chambers. Each of the piezoelectric elements 48 is expanded or contracted by application of a driving voltage that is described below, and applies a pressure to ink in a corresponding pressurizing chamber. This allows a corresponding ink ejection portion 44 to eject ink of a corresponding color toward the sheet S conveyed in the running direction D3. In other words, the corresponding ink ejection portion 44 ejects an ink droplet based on the driving voltage. This allows an image to be recorded on the sheet S based on the image data.

It is noted that the recording heads 42 may be of a thermal type instead of the piezo-type, wherein the thermal type causes an ink droplet to be ejected by causing a heater to heat the ink so as to generate an air bubble in the ink.

The discharge portion 7 includes a discharge roller pair 71 and a discharge tray 72, and discharges, as a print, a recording medium on which the image is recorded, from the housing 1 to outside the inkjet recording apparatus 100.

The control portion 8 includes a CPU, a ROM, a RAM, and a nonvolatile memory, executes a program stored in the ROM or the like, and comprehensively controls recording of the image. The control portion 8 may include, instead of the CPU, a microcomputer or an electronic circuit(s) such as an ASIC (Application Specific Integrated Circuit) or a DSP (Digital Signal Processor).

Figure 3:
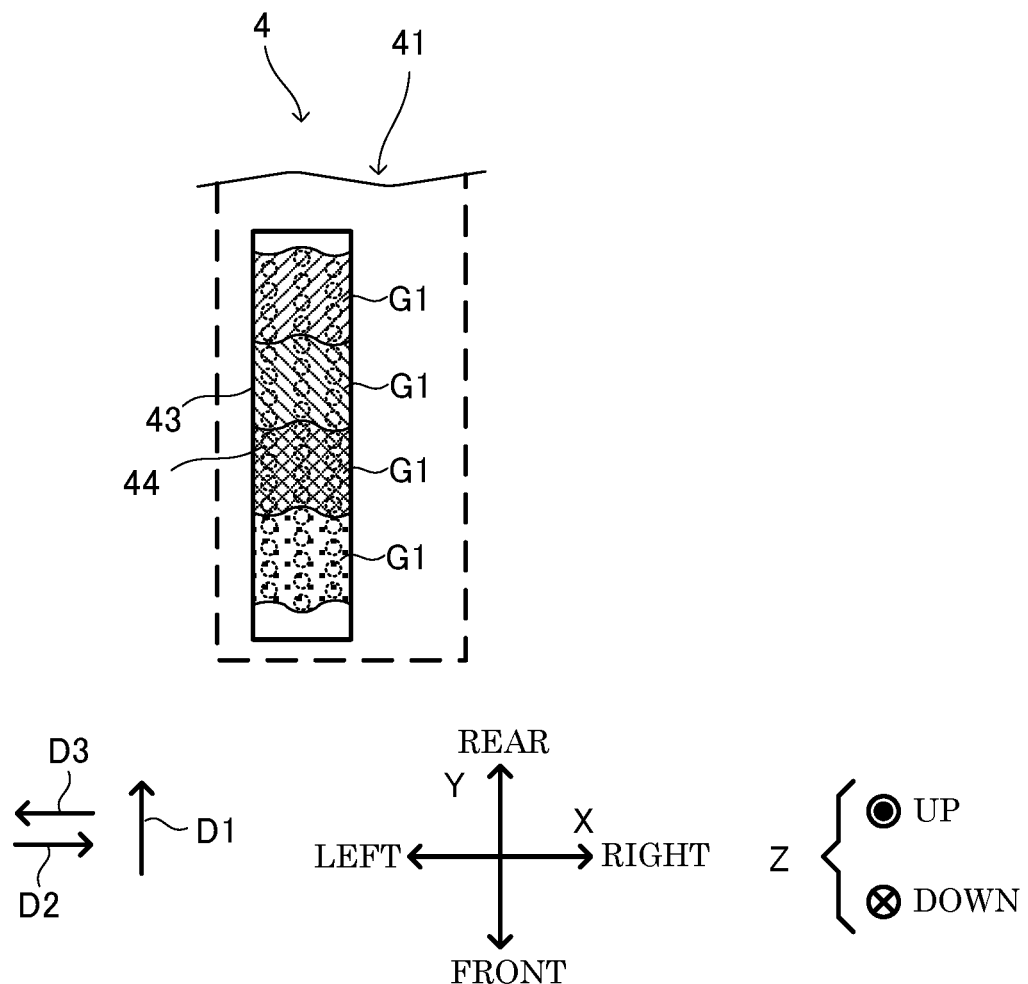
FIG. 3 is a schematic diagram showing groups of the ink ejection portions shown in FIG. 2.

In each of the recording heads 42, the large number of ink ejection portions 44 are grouped into a plurality of (in this example, four) groups G1 (see FIG. 3). More specifically, in each of the recording heads 42, the large number of ink ejection portions 44 are grouped into, in the main scanning direction D1: a group G1 on the most front side; a group G1 on the most depth side; a group G1 that is the second from the front side; and a group G1 that is the second from the depth side. In FIG. 3, a plurality of ink ejection portions 44 in a same group are represented by a hatching unique to the group. Here, for convenience of explanation, group numbers 1, 2, 3, and 4 are respectively assigned to the first, second, third, and fourth groups G1, from the front side in the main scanning direction D1. The group numbers 1, 2, 3, and 4 are represented by k (namely, k=1, 2, 3, 4).

Figure 4:
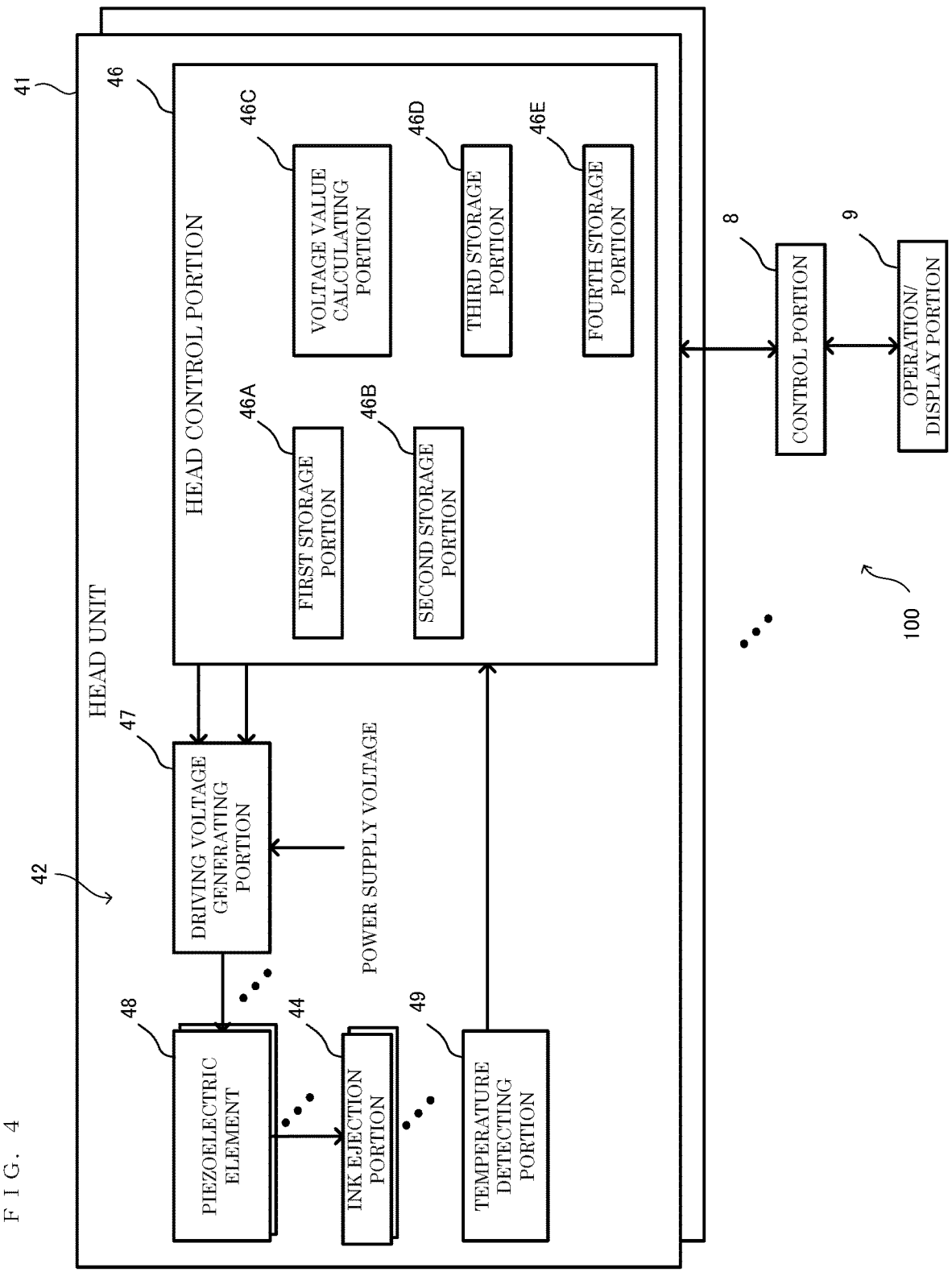
FIG. 4 is a block diagram showing a configuration of a recording head unit shown in FIG. 1.

As shown in FIG. 4, each of the head units 41 includes a head control portion 46, a plurality of (as many as the number of groups G1: in this example, four) driving voltage generating portions 47, a plurality of piezoelectric elements 48 that are provided in correspondence with a plurality of ink ejection portions 44, and a temperature detecting portion 49.

The head control portion 46 includes a CPU, a ROM, a RAM, and a nonvolatile memory, executes a program stored in the ROM or the like, and controls driving of the ink ejection portions 44. The head control portion 46 may include the electronic circuit(s) instead of the CPU.

A power supply device (not shown) supplies a power supply voltage to each of the driving voltage generating portions 47. Furthermore, the head control portion 46 inputs reference voltage values of each of the groups G1 to a corresponding driving voltage generating portion 47. It is noted that the reference voltage values are either first reference voltage values FVijk or second reference voltage values SVijk that are described below. Furthermore, ejection number information for each of the ink ejection portions 44 that belong to a group G1 is input to a corresponding driving voltage generating portion 47. The ejection number information indicates the number of times that an ink droplet is ejected per unit time from each of the ink ejection portions 44. The ejection number information is generated by the head control portion 46 based on the image data.

Figure 5:
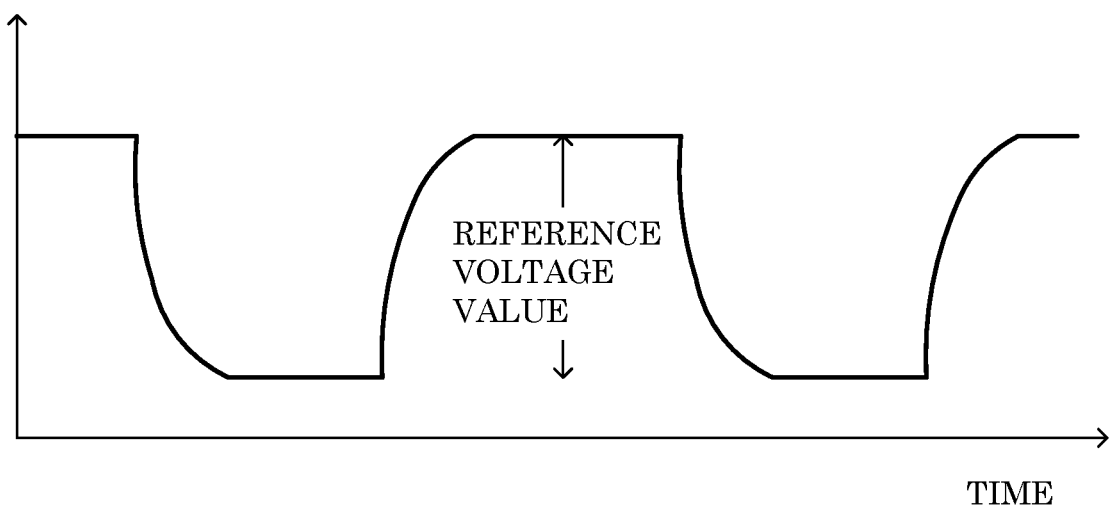
FIG. 5 is a diagram showing a time waveform of a driving voltage applied to piezoelectric elements shown in FIG. 4.

Each of the driving voltage generating portions 47 generates, from the power supply voltage, a plurality of driving voltages that are respectively applied to the plurality of piezoelectric elements 48. As shown in FIG. 5, each of the plurality of driving voltages has a pulse waveform. In FIG. 5, an amplitude value of the plurality of driving voltages is the reference voltage value. In addition, each of the plurality of driving voltages has pulses whose number corresponds to the number of times that the ink droplet is ejected per unit time from the corresponding ink ejection portion 44. Each of the driving voltage generating portions 47 outputs the plurality of driving voltages to a plurality of piezoelectric elements 48 that are provided respectively in the front stages of the corresponding ink ejection portions 44 (see FIG. 4).

In FIG. 4, the plurality of piezoelectric elements 48 are expanded or contracted based on the driving voltages applied thereto, thereby causing ink droplets to be ejected from corresponding ink ejection portions 44.

The temperature detecting portion 49 is, for example, a thermister, and outputs a temperature signal to the head control portion 46, wherein a voltage value of the temperature signal changes in response to the temperature of ink in the ink passage.

The inkjet recording apparatus 100 further includes an operation/display portion 9. The operation/display portion 9 is provided on an upper-front part of the housing 1. The operation/display portion 9 includes, for example, a touch screen, displays various types of data, and receives various types of inputs from users.

Conventionally, an inkjet recording apparatus includes a recording head unit including a plurality of piezoelectric elements, wherein the piezoelectric elements are expanded or contracted when driving voltages are applied thereto from a driving voltage generating portion, thereby ink droplets are ejected from a plurality of ink ejection portions toward a sheet.

There is a demand for an inkjet recording apparatus that allows the user side to change the density of an image that is recorded by the inkjet recording apparatus. However, to change the image density, it is necessary to change the reference voltage values that are used to generate the driving voltages, based on the density measured by a dedicated colorimeter. In addition, a high-level skill is required to change the driving voltages. As a result, it is difficult for the user side to change the image density.

The head control portion 46 further includes a first storage portion 46A, a second storage portion 46B, a voltage value calculating portion 46C, a third storage portion 46D, and a fourth storage portion 46E so as to simplify the operation of changing the image density.

Figure 6:
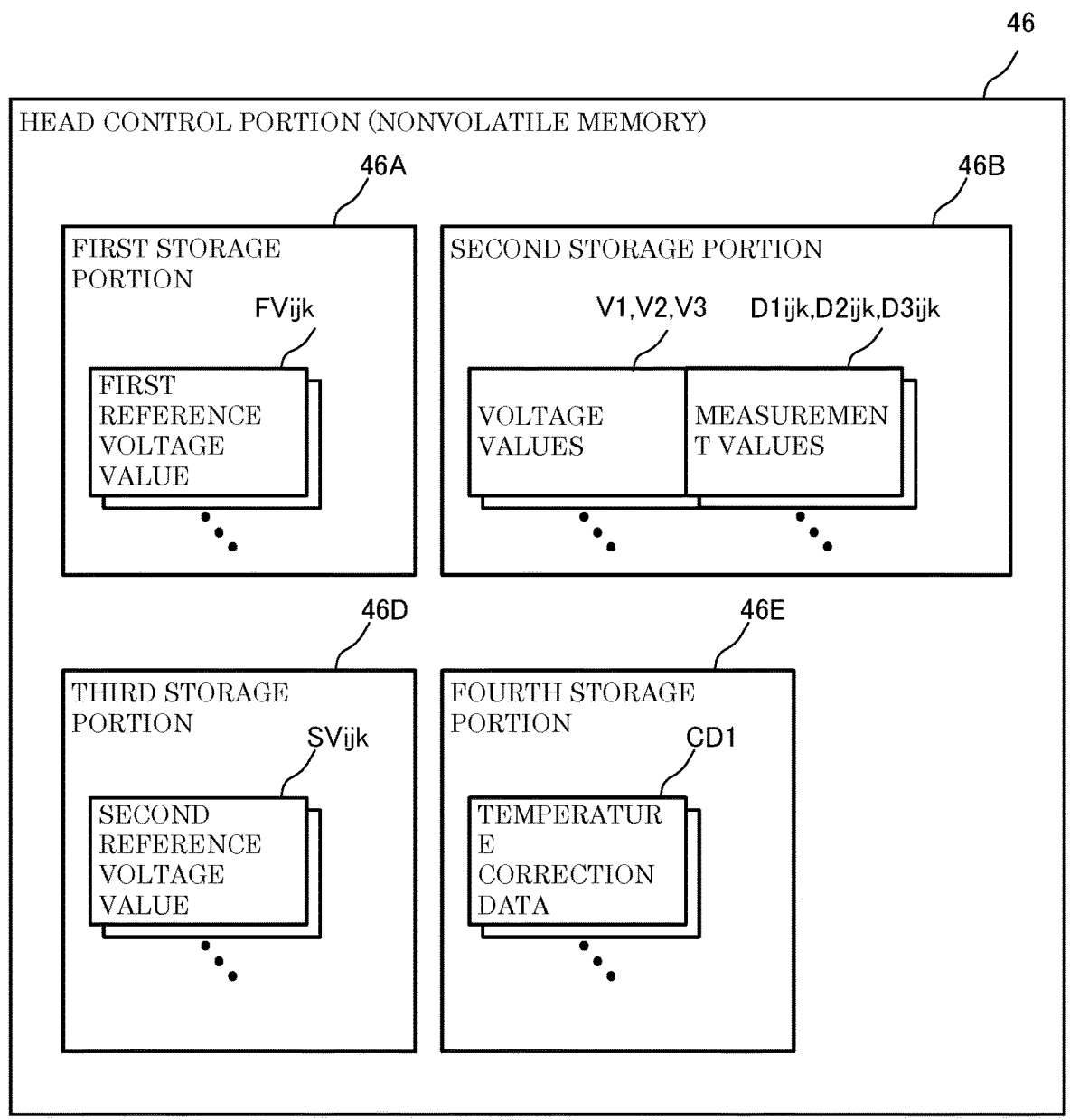
FIG. 6 is a diagram showing information stored in a first storage portion, a second storage portion, a third storage portion, and a fourth storage portion shown in FIG. 4.

The first storage portion 46A, the second storage portion 46B, the third storage portion 46D, and the fourth storage portion 46E are storage areas secured in advance in the nonvolatile memory of the head control portion 46 (see FIG. 6).

The first storage portion 46A stores, in advance, the first reference voltage values FVijk that correspond to a predetermined first image density value.

The second storage portion 46B stores, in advance: voltage values V1 to V3 (an example of a plurality of voltage values) that are different from each other; and measurement values D1$ijk$ to D3$ijk$ (an example of a plurality of measurement values) that indicate image densities respectively corresponding to the voltage values V1 to V3.

The third storage portion 46D stores the second reference voltage values SVijk calculated by the voltage value calculating portion 46C.

The image density changes with the temperature of the ink in the ink passage. As a result, the fourth storage portion 46E stores, in advance, temperature correction data CD1 for a temperature correction of the first reference voltage values FVijk and the second reference voltage values SVijk.

In FIG. 4, before a predetermined change timing for changing the image density, the head control portion 46 reads a plurality of first reference voltage values FVijk from the first storage portion 46A, and outputs the first reference voltage values FVijk to the driving voltage generating portions 47. The driving voltage generating portions 47 generates driving voltages having the first reference voltage values FVijk, and applies the driving voltages to corresponding ink ejection portions 44. The ink ejection portions 44 eject ink droplets based on the driving voltages, thereby recording an image on a sheet S (see FIG. 1).

The voltage value calculating portion 46C is implemented when the head control portion 46 executes the program. At the change timing, the voltage value calculating portion 46C calculates the second reference voltage values SVijk based on the voltage values V1 to V3 and the measurement values D1$ijk$ to D3$ijk$, and outputs the second reference voltage values SVijk to the driving voltage generating portions 47, wherein the second reference voltage values SVijk correspond to a second image density value that is different from the first image density value. The driving voltage generating portions 47 operate as a voltage switching portion of the present disclosure, and switch the driving voltages that are applied to the ink ejection portions 44, from driving voltages having the first reference voltage values FVijk to driving voltages having the second reference voltage values SVijk.

An upper-limit value UL1 and a lower-limit value LL1 of the driving voltages are determined in advance. When at least one of the second reference voltage values SVijk respectively for the ink ejection portions 44 is higher than the upper-limit value UL1 or lower than the lower-limit value LL1, the voltage value calculating portion 46C changes the second reference voltage values SVijk to values that are each equal to or lower than the upper-limit value UL1 and equal to or higher than the lower-limit value LL1.

Specifically, when at least one of the second reference voltage values SVijk respectively for the ink ejection portions 44 is higher than the upper-limit value UL1, the voltage value calculating portion 46C changes the second reference voltage values SVijk by multiplying a value that is obtained by dividing the upper-limit value UL1 by a maximum value SVmax of the second reference voltage values SVijk, by each of the second reference voltage values SVijk. On the other hand, when at least one of the second reference voltage values SVijk respectively for the ink ejection portions 44 is lower than the lower-limit value LL1, the voltage value calculating portion 46C changes the second reference voltage values SVijk by multiplying a value that is obtained by dividing the lower-limit value LL1 by a minimum value SVmin of the second reference voltage values SVijk, by each of the second reference voltage values SVijk.

Specifically, the voltage value calculating portion 46C receives ratio information of the first image density value, derives the second image density value based on the ratio information, and then obtains a second reference voltage value that corresponds to the second image density value.

The second storage portion 46B may store, in advance, the voltage values V1 to V3 and the measurement values D1$ijk$ to D3$ijk$ for each type of sheet S. In this case, the voltage value calculating portion 46C calculates the second reference voltage values SVijk corresponding to a second target value SDi (described in detail below), based on the voltage values V1 to V3 and the measurement values D1$ijk$ to D3$ijk$ corresponding to a type of sheet S on which an image is to be recorded.

The second storage portion 46B may store, in advance: the voltage values V1 to V3 and the measurement values D1$ijk$ to D3$ijk$ for each permeation level of sheet S, the permeation level indicating a level of permeation of moisture contained in the ink droplet to the sheet S. In this case, the voltage value calculating portion 46C calculates the second reference voltage values SVijk corresponding to the second target value SDi, based on the voltage values V1 to V3 and the measurement values D1$ijk$ to D3$ijk$ corresponding to the permeation level of the sheet S on which an image is to be recorded.

In the following, the processing procedure of the head control portion 46 is described in detail with reference to FIG. 7 to FIG. 13.

A plurality of first reference voltage values FVijk, the voltage values V1 to V3, and the measurement values D1$ijk$ to D3$ijk$ are stored in the first storage portion 46A and the second storage portion 46B at the manufacturing stage of the inkjet recording apparatus 100.

In the following, a process of storing the first reference voltage values FVijk, the voltage values V1 to V3, and the measurement values D1$ijk$ to D3$ijk$ is described in detail with reference to FIG. 7 to FIG. 9.

First, the ambient temperature of the inkjet recording apparatus 100 is adjusted to a predetermined reference temperature (for example, 25° C.) (step S1 in FIG. 7). Sheets S of a same type are stored in the sheet storage portion 2 (step S2). A first target value FDi of the image density is determined for each of the colors (step S3). The first target value FDi corresponds to a first image density value of the present disclosure. The letter "i" in the "FDi" represents the color number (i=1, 2, 3, 4). Thus, for example, a first target value FD1 represents a target value for magenta.

Subsequently, driving voltage values to be applied by the driving voltage generating portions 47 to the piezoelectric elements 48 of the corresponding groups G1 are set to a predetermined voltage value V1 (for example, 19.0V) (step S4). Under the above-described conditions, the inkjet recording apparatus 100 records a chart image C1 (see FIG. 8) on a sheet S (step S5).

Figure 8:
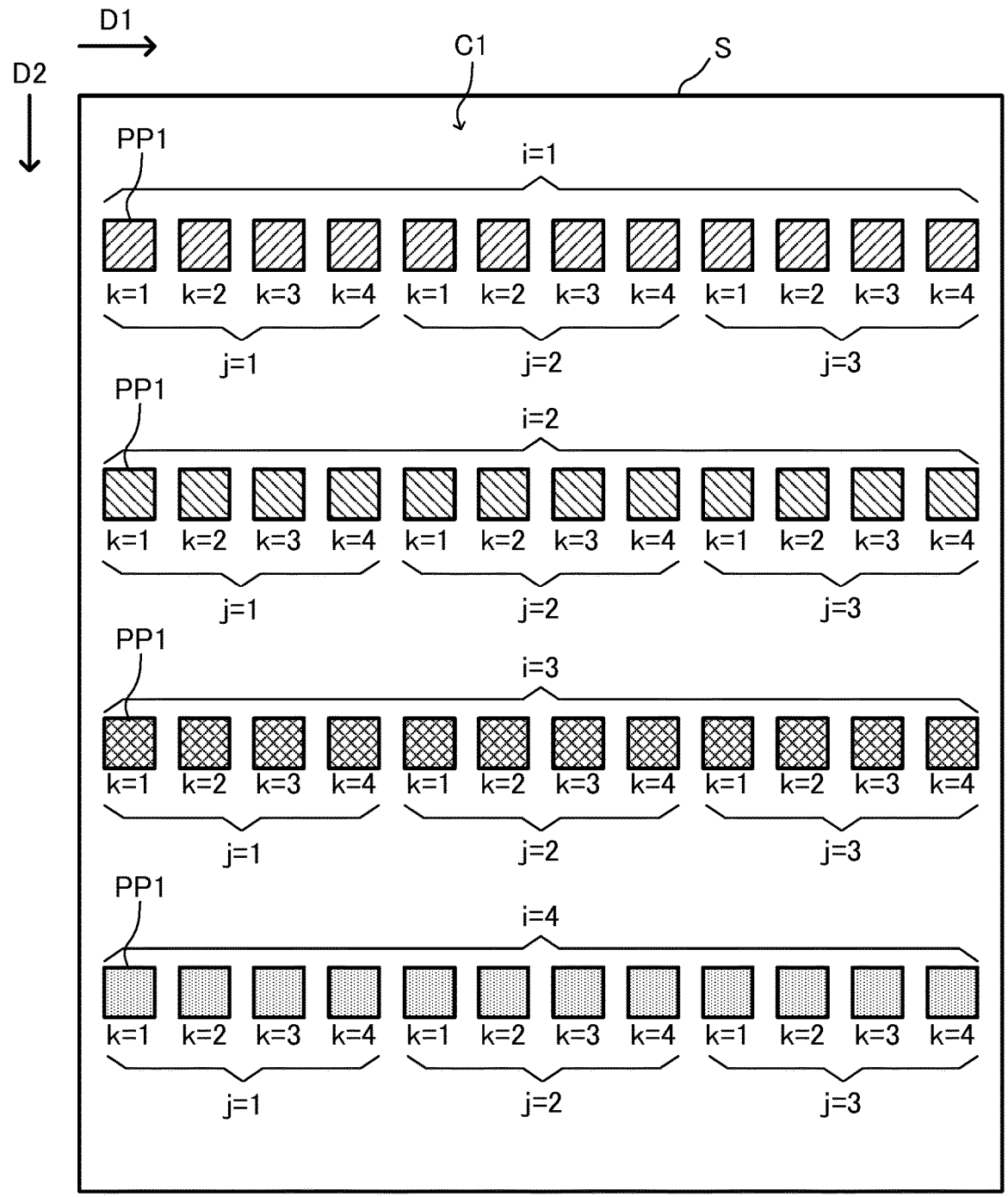
FIG. 8 is a schematic diagram showing a chart image used in the procedure shown in FIG. 7.

In FIG. 8, the chart image C1 includes a plurality of solid pattern images PP1 that are recorded in units of the groups G1. The solid pattern images PP1 have a same rectangular shape, and are recorded at different positions on the sheet S. More specifically, the plurality of solid pattern images PP1 are arranged such that two or more solid pattern images PP1 are arranged at intervals in alignment respectively in the main scanning direction D1 and in the sub scanning direction D2.

In the present embodiment, the chart image C1 includes 48 solid pattern images PP1. In addition, in FIG. 8, a reference sign "PP1" is attached to one solid pattern image per color. Specifically, in the sheet S, in each column extending in the sub scanning direction D2, four solid pattern images PP1 of different colors are aligned, and in each row extending in the main scanning direction D1, 12 solid pattern images PP1 of a same color are aligned. In FIG. 8, a same hatching is applied to the solid pattern images PP1 of a same color.

In FIG. 8, each of the solid pattern images PP1 is identified by the color number i, the head number j, and the group number k, and is recorded by the ink ejection portions 44 included in a corresponding group G1. For example, a solid pattern image PP1 of i=j=k=1 is recorded by an ink ejection portion 44 that belongs to a group G1 (k=1) that is on the most front side of a recording head 42 (j=1) that is on the front side of the head unit 41 for magenta (i=1).

Figure 7:
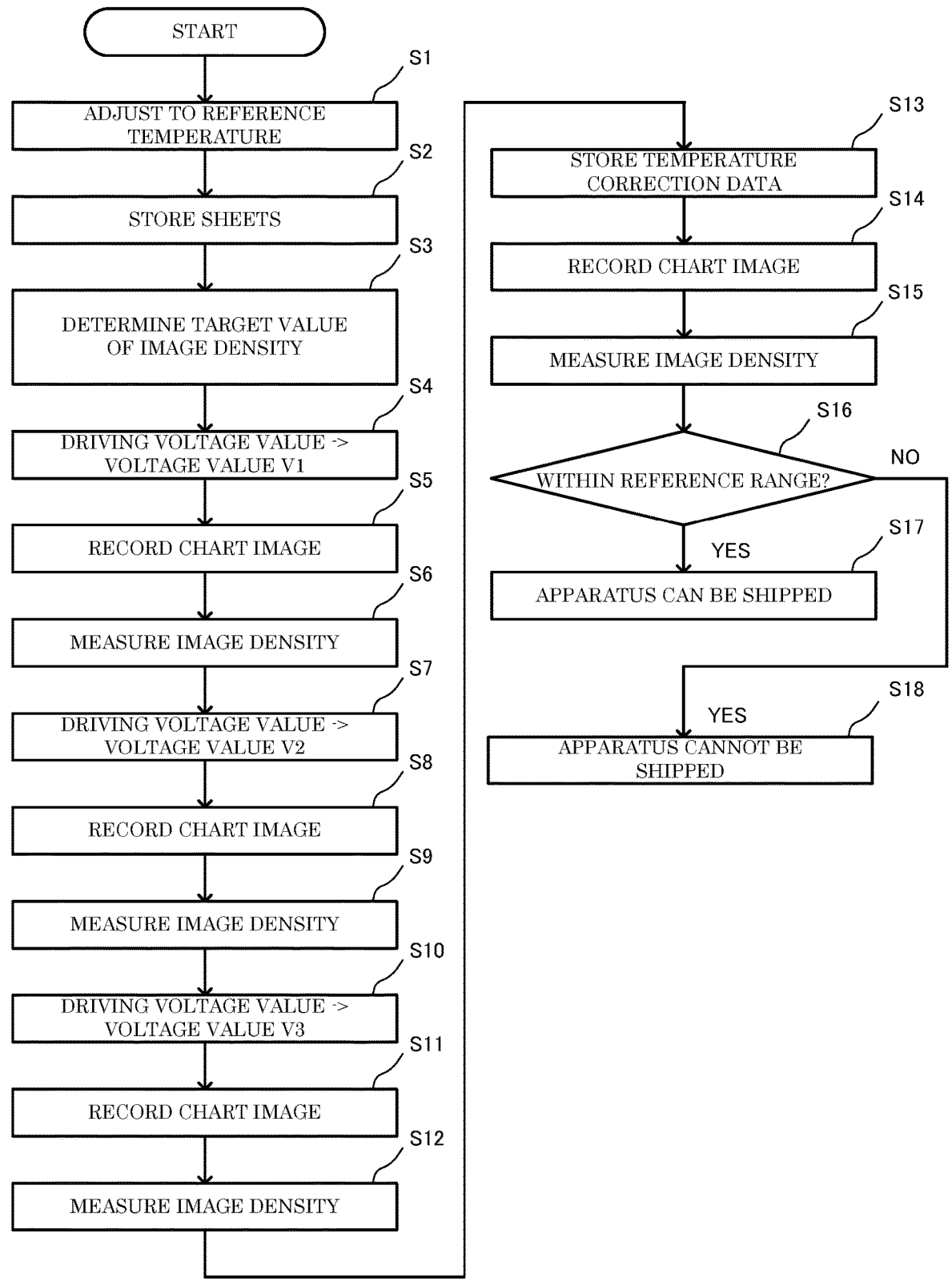
FIG. 7 is a flowchart showing a procedure for storing first reference voltage values, voltage values, and measurement values shown in FIG. 6.

The image density of each of the solid pattern images PP1 recorded on the sheet S is measured by a dedicated colorimeter (not shown) (step S6 in FIG. 7). In the following, the measurement value D1$ijk$ represents a measurement value of each of the solid pattern images PP1 that is measured when the driving voltage has been set to the voltage value V1. Thus, for example, measurement value D1111 represents a measurement value of a solid pattern image PP1 of i=j=k=1.

Next, the driving voltage value is changed to a voltage value V2 (V2=20.5V) (step S7). Subsequently, the chart image C1 (see FIG. 8) is recorded on another sheet S by the inkjet recording apparatus 100 (step S8). Thereafter, the measurement value D2$ijk$ is measured for each of the solid pattern images PP1 (step S9). For example, measurement value D2222 represents a measurement value of a solid pattern image PP1 of i=j=k=2 that is measured when the driving voltage is the voltage value V2.

Next, the driving voltage value is changed to a voltage value V3 (V3=22.0V), the chart image C1 is recorded by the inkjet recording apparatus 100, and the measurement value D3$ijk$ is measured for each of the solid pattern images PP1 included in the chart image C1 (steps S10 to S12).

Figure 9:
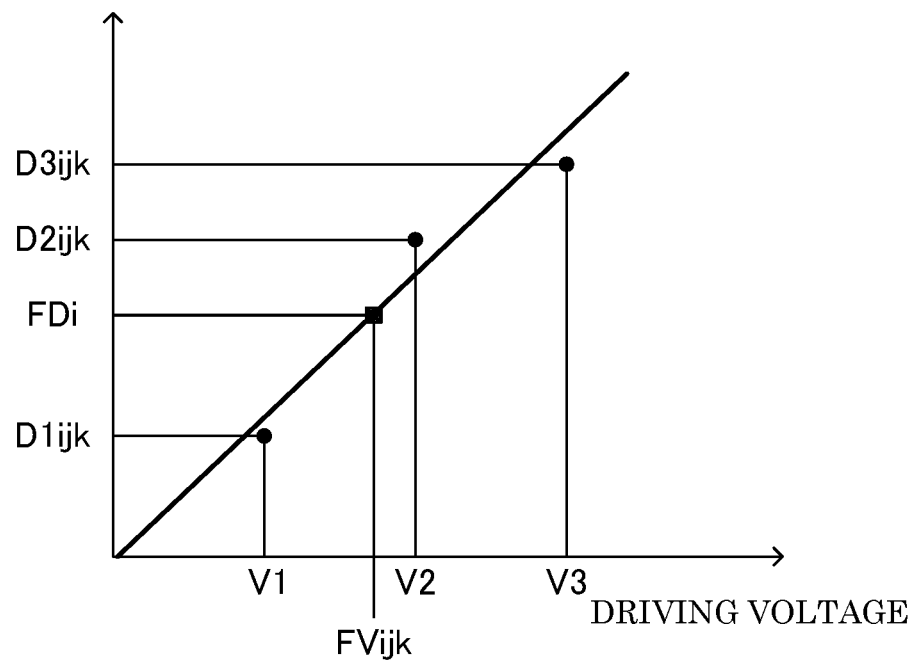
FIG. 9 is a diagram showing how to obtain the first reference voltage values shown in FIG. 6.

Next, based on the least squares method or the like, the first reference voltage values FV$ijk$ are calculated for each group G1 of each recording head 42 based on the voltage values V1, V2 and V3 and measurement values D1$ijk$, D2$ijk$ and D3$ijk$ (see FIG. 9). Each of the first reference voltage values FV$ijk$ is a driving voltage value for obtaining an image density of the first target value FDi under the reference temperature (25° C.). Each of the first reference voltage values FV$ijk$ is stored in the first storage portion 46A of a corresponding head unit 41 (see FIG. 6). The voltage values V1, V2 and V3 as the plurality of voltage values and the measurement values D1$ijk$, D2$ijk$ and D3$ijk$ as the plurality of measurement values are stored in a corresponding second storage portion 46B (see FIG. 6).

For example, 12 first reference voltage values FV1$jk$=1, 2, 3; k=1, 2, 3, 4) are stored in a head unit 41 of i=1. In the head unit 41 of i=1, a set of voltage values V1, V2 and V3 and 12 sets of measurement values D11$jk$, D21$jk$ and D31$jk$=1, 2, 3; k=1, 2, 3, 4) are stored linked to each other.

In addition, the temperature correction data CD1 is stored in the fourth storage portion 46E (step S13). The temperature correction data CD1 may be table data in which are written correction coefficients for correcting the first reference voltage values FV$ijk$ and the second reference voltage values SV$ijk$ in correspondence with each of a plurality of temperatures of the ink. Alternatively, the temperature correction data CD1 may be a formula used for a temperature correction of the first reference voltage values FV$ijk$ and the second reference voltage values SV$ijk$ based on the Andrade's viscosity formula.

To confirm each of the first reference voltage values FV$ijk$, the inkjet recording apparatus 100 is operated to record the chart image C1 (see FIG. 8) again on a sheet S (step S14).

In this step, in each of the head units 41, the head control portion 46 operates as follows. That is, first, the head control portion 46 receives a temperature signal for the ink passage from a corresponding temperature detecting portion 49, and obtains the temperature of the ink of a corresponding color from the temperature signal. Next, the head control portion 46 corrects the first reference voltage values FV$ijk$ stored in the corresponding second storage portion 46B using the temperature correction data CD1. The head control portion 46 then outputs the corrected first reference voltage values FV$ijk$ to a corresponding driving voltage generating portion 47. The driving voltage generating portion 47 generates, from the power supply voltage, driving voltages including the corrected first reference voltage values FV$ijk$, in units of groups G1.

The inkjet recording apparatus 100 discharges a print on which the chart image C1 has been recorded based on the first reference voltage values FV$ijk$ after the temperature correction. Thereafter, the measurement values D$ijk$, as values of the image density, of the solid pattern images PP1 are measured by the colorimeter for a case where the first reference voltage values FV$ijk$ after the temperature correction are used (step S15).

When all difference values between the measurement values D$ijk$ and the first target value FDi are within a predetermined reference range (YES at step S16), it is determined that the inkjet recording apparatus 100 can be shipped (step S17). On the other hand, when at least one of the difference values is not within the reference range (NO at step S16), it is determined that the inkjet recording apparatus 100 cannot be shipped (step S18).

Figure 10:
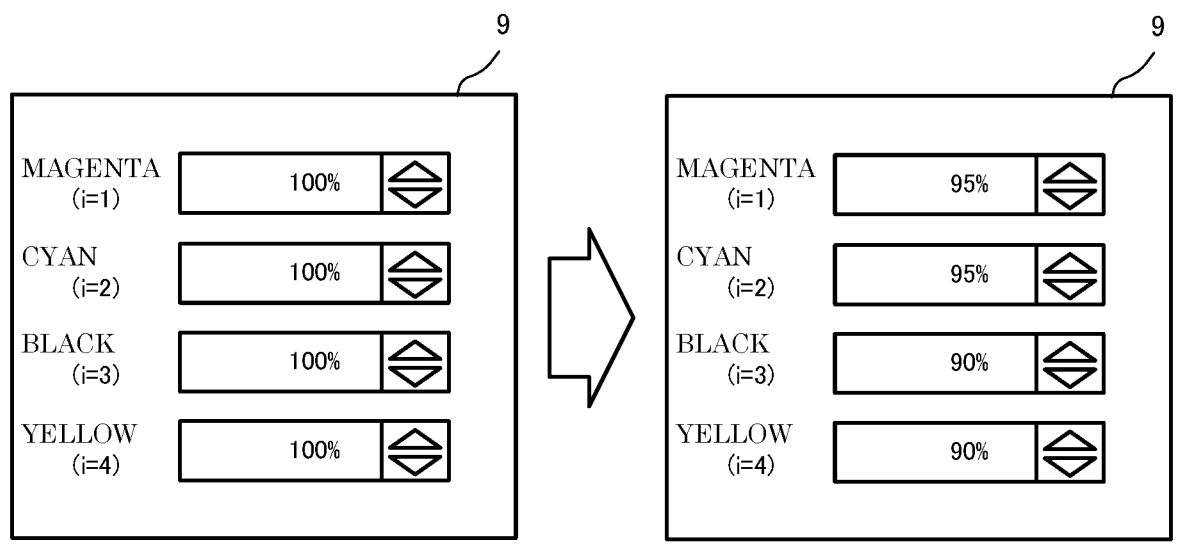
FIG. 10 is a schematic diagram showing a first example of a setting screen displayed on an operation/display portion shown in FIG. 4.

In the following, the processing procedure of a process for changing the image density performed by the control portion 8 and the head control portion 46 is described in detail with reference to FIG. 10 to FIG. 12.

After shipment, the user side operates the inkjet recording apparatus 100 to record an image on a sheet S based on the image data, thereby generating a print. During this process, in each of the recording heads 42, the head control portion 46 operates as in step S14.

To change the image density, the user operates the operation/display portion 9 to let it display a setting screen for setting the image density on it. In response to the user's operation, the control portion 8 displays the setting screen (see FIG. 10) on the operation/display portion 9. In FIG. 10, on the operation/display portion 9, the user specifies, for each color, the second target value SDi that is an image density after change, by a ratio to the first target value FDi (for example, a percentage). Here, the second target value SDi corresponds to a second image density value of the present disclosure.

The operation/display portion 9 transmits operation data indicating the ratio for each color to the control portion 8. The control portion 8 generates, based on the operation data, ratio information that indicates the ratio for each color, and transmits the ratio information to the head control portion 46 for each color (step S21 in FIG. 11).

Upon receiving the ratio information (step S22 in FIG. 11), each head control portion 46 functions as the voltage value calculating portion 46C in steps S23 to S33.

Each head control portion 46 reads the first reference voltage values FVijk from a corresponding first storage portion 46A, and derives the second target value SDi=1, 2, 3, 4) for a corresponding color by multiplying the ratio indicated by the ratio information of the corresponding color. In addition, each head control portion 46 reads, onto the RAM, the voltage values V1 to V3, and 12 measurement values D1$ijk$, D2$ijk$ and D3$ijk$=1, 2, 3; k=1, 2, 3, 4) (step S23).

Next, each head control portion 46 sets each of value j of the first counter (not shown) and value k of the second counter (not shown) to 1 (one) (step S24). Subsequently, each head control portion 46 selects measurement values D1$ijk$, D2$ijk$ and D3$ijk$ that correspond to the values j and k (step S25). As shown in FIG. 12, each head control portion 46 calculates, on the RAM, the second reference voltage values SVijk of each group G1 of each recording head 42 corresponding to the values j and k, by the least squares method or the like, based on the voltage values V1, V2 and V3 and the measurement values D1$ijk$, D2$ijk$ and D3$ijk$ (step S26).

Next, each head control portion 46 determines whether or not the value k of the second counter is 4 (step S27). Upon determining that the value k is not 4, each head control portion 46 determines that there remains a group G1 to be selected in the recording head 42, and increments the value k by 1 (one) (step S28), and then returns to step S25.

On the other hand, upon determining that the value k is 4, each head control portion 46 determines that the second reference voltage values SVijk have been derived with regard to all the groups G1 in the recording head 42, and determines whether or not value j of the first counter is 3 (step S29). Upon determining that the value j is not 3, each head control portion 46 determines that there remains a recording head 42 to be selected, and increments the value j by 1 (one) (step S30), and then returns to step S25.

On the other hand, upon determining that the value j is 3, each head control portion 46 determines that the second reference voltage values SVijk have been derived with regard to all the groups G1 in all the recording heads 42, and stores the 12 second reference voltage values SVijk on the RAM, into the third storage portion 46D (step S31).

Following the step S31, each head control portion 46 notifies the control portion 8 that storage of the second reference voltage values SVijk has been completed (step S32). Upon receiving the notification from all the head control portions 46, the control portion 8 operates the inkjet recording apparatus 100 so as to record the chart image C1 (see FIG. 8) on a sheet S again for confirmation of the second reference voltage values SVijk of each recording head 42 (step S33).

In step S33, in each head unit 41, each head control portion 46 obtains the temperature of the ink of the corresponding color based on the temperature signal from the corresponding temperature detecting portion 49. Next, each head control portion 46 corrects the second reference voltage values SVijk in the third storage portion 46D based on the temperature correction data CD1. Each head control portion 46 outputs the corrected second reference voltage values SVijk to the corresponding driving voltage generating portion 47. The driving voltage generating portion 47 generates, from the power supply voltage, driving voltages including the corrected second reference voltage values SVijk, in units of groups G1. After the completion of step S33, the control portion 8 ends the process of FIG. 11.

Figure 11:
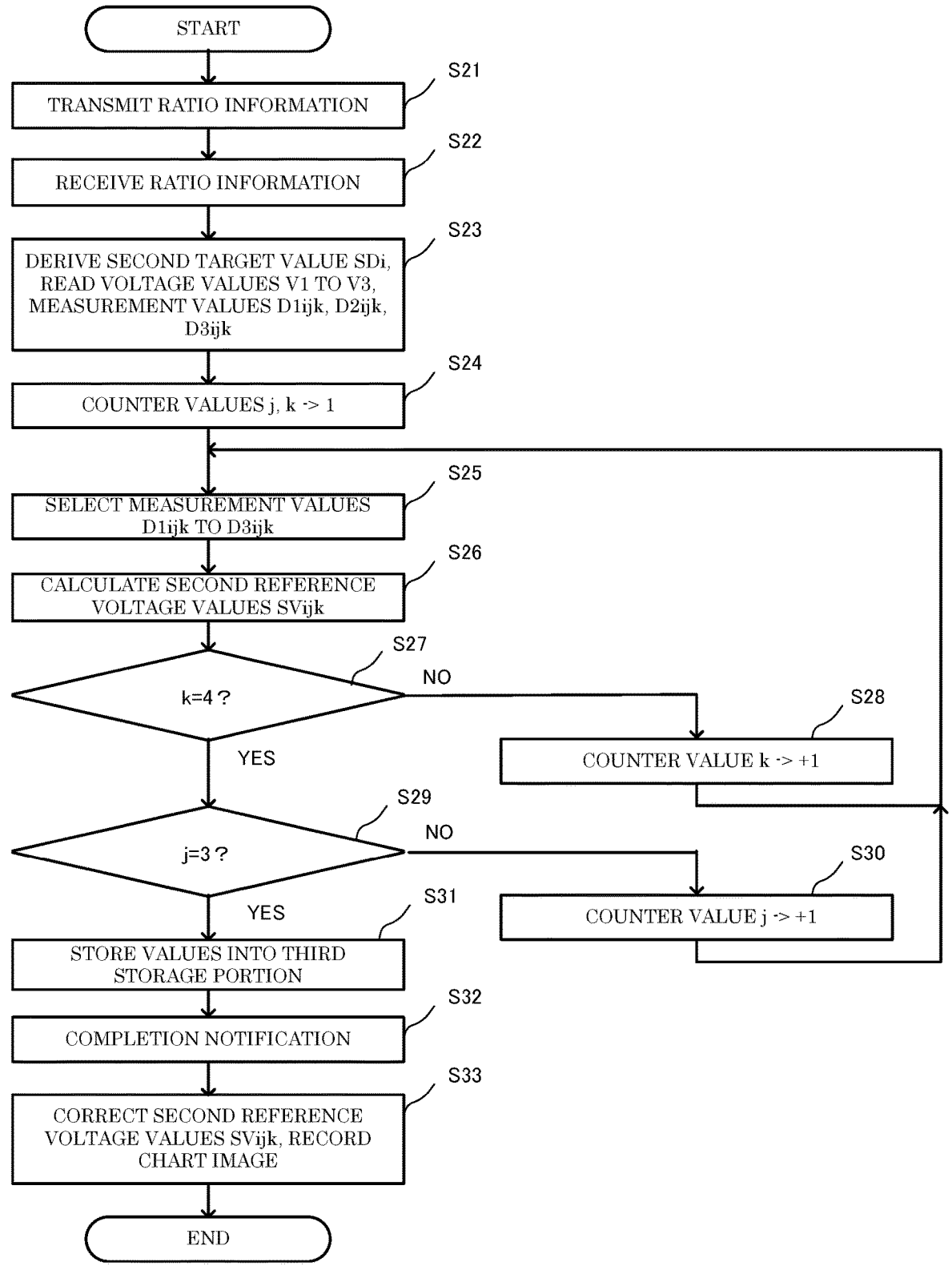
FIG. 11 is a flowchart showing a procedure of an image density changing process executed by a control portion and a head control portion shown in FIG. 4.
Figure 12:
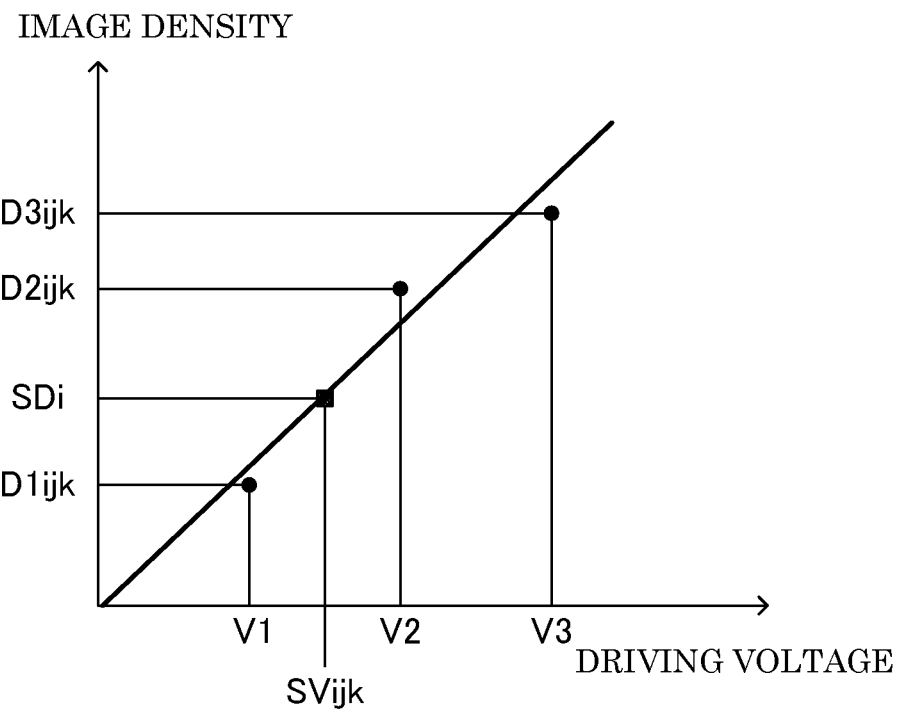
FIG. 12 is a diagram showing how to obtain second reference voltage values shown in FIG. 6.

With the process of FIG. 11, the inkjet recording apparatus 100 discharges, onto the discharge tray 72 (see FIG. 1), a print on which the chart image C1 has been recorded based on the second reference voltage values SVijk after the temperature correction. Thereafter, if the user wants to further change the image density of the print, the user performs the operation again to display the setting screen for setting the image density. If the user does not want to further change the image density of the print, the user ends the process for changing the image density.

After the image density is changed, the inkjet recording apparatus 100 records the image on the sheet S based on the image data transmitted from the image processing apparatus or the like. At this time, in each head unit 41, each head control portion 46 obtains the temperature of the ink of the corresponding color based on the temperature signal from the corresponding temperature detecting portion 49. Each head control portion 46 corrects the second reference voltage values SVijk stored in the third storage portion 46D based on the temperature correction data CD1. Each head control portion 46 outputs the corrected second reference voltage values SVijk to the corresponding driving voltage generating portion 47. The driving voltage generating portion 47 generates, from the power supply voltage, driving voltages including the corrected second reference voltage values SVijk, in units of groups G1, and applies the driving voltages to the corresponding ink ejection portions 44. In other words, the driving voltage generating portions 47 operate as the voltage switching portion of the present disclosure, and switches the driving voltages that are applied to the ink ejection portions 44, from driving voltages having the first reference voltage values FVijk to driving voltages having the second reference voltage values SVijk.

As described above, according to the inkjet recording apparatus 100, a plurality of voltage values V1 to V3 and a plurality of measurement values D1$ijk$ to D3$ijk$ are stored in the second storage portion 46B before the shipment. During the process for changing the image density, each head control portion 46 functions as the voltage value calculating portion 46C, and calculates the second reference voltage values SVijk corresponding to the second target value SDi for the image density after the change. With this configuration, the user does not need a dedicated colorimeter or a special skill for changing the image density, but only needs to operate the operation/display portion 9. That is, according to the inkjet recording apparatus 100, the user can change the image density easily.

It is noted that in the present embodiment, the timing for changing the image density is when the control portion 8 obtains the second target value SDi. However, not limited to this, the timing for changing the image density may be immediately after at least one of the head units 41 of the image recording portion 4 is replaced.

Figure 13:
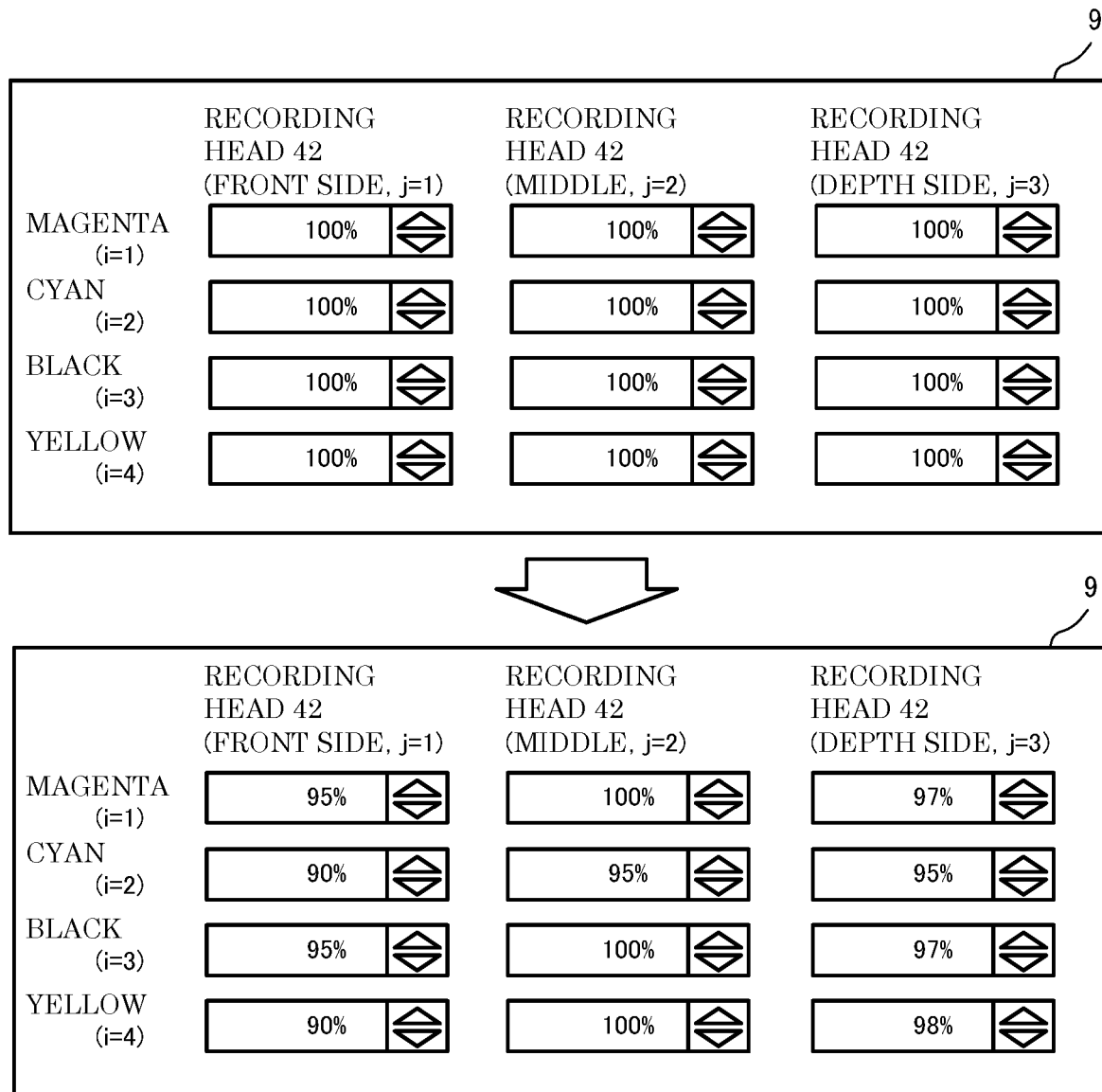
FIG. 13 is a schematic diagram showing a second example of the setting screen displayed on the operation/display portion shown in FIG. 4.

In the present embodiment, the first target value FDi and the second target value SDi are set for each of the colors. However, not limited to this, the first target value FDi and the second target value SDi may be set in units of the recording heads 42. In this case, the control portion 8 displays a setting screen shown in FIG. 13 for setting the second target value SDi. As shown in FIG. 13, on the operation/display portion 9, the user specifies, for each recording head 42, the second target value SDij (i=1, 2, 3, 4; j=1, 2, 3) that is an image density after change. Here, for example, the second target value SDij is specified by a percentage of the first target value FDij. Based on the second target value SDi set in this way, each head control portion 46 obtains the second reference voltage values SVijk for obtaining image densities that are different for each of the recording heads 42.

[Modifications]

In the following, modifications of the embodiment are described. It is noted that in the following modifications, structural elements and steps that are the same as those of the embodiment are assigned the same reference signs and step numbers, and description thereof is omitted.

The upper-limit value UL1 and the lower-limit value LL1 for each driving voltage are determined in advance based on the input/output characteristics of each piezoelectric element 48 or the like. The upper-limit value UL1 is, for example, 29.0V, and the lower-limit value LL1 is, for example, 16.0V. If the second reference voltage value SVijk after the temperature correction is higher than the upper-limit value UL1 or lower than the lower-limit value LL1, it affects the quality of the image of the print.

For this reason, in step S31, each head control portion 46 may obtain the second reference voltage values SVijk after the temperature correction from another head control portion 46. In the present modification, each head control portion 46 obtains 48 second reference voltage values SVijk after the temperature correction in total.

Each head control portion 46 obtains the maximum value SVmax from among all the second reference voltage values SVijk after the temperature correction. It is noted that each head control portion 46 may obtain the maximum value SVmax from among the second reference voltage values SVijk after the temperature correction (in the present embodiment, 12 second reference voltage values SVijk) that were obtained by the head control portion 46 itself. In a case where the maximum value SVmax is higher than the upper-limit value UL1, each head control portion 46 changes the second reference voltage values SVijk after the temperature correction by multiplying a value that is obtained by dividing the upper-limit value UL1 by the maximum value SVmax, by each of the second reference voltage values SVijk after the temperature correction.

In addition, in a case where the maximum value SVmax is not higher than the upper-limit value UL1, each head control portion 46 obtains the minimum value SVmin from among all the second reference voltage values SVijk after the temperature correction. It is noted that each head control portion 46 may obtain the minimum value SVmin from among the second reference voltage values SVijk after the temperature correction that were obtained by the head control portion 46 itself. In a case where the minimum value SVmin is lower than the lower-limit value LL1, each head control portion 46 changes the second reference voltage values SVijk after the temperature correction by multiplying a value that is obtained by dividing the lower-limit value LL1 by the minimum value SVmin, by each of the second reference voltage values SVijk after the temperature correction.

In a case where the maximum value SVmax is not higher than the upper-limit value UL1 and the minimum value SVmin is not lower than the lower-limit value LL1, each head control portion 46 does not change the second reference voltage values SVijk after the temperature correction. It is noted that there is no case where the maximum value SVmax is higher than the upper-limit value UL1 and the minimum value SVmin is lower than the lower-limit value LL1.

As described above, according to the inkjet recording apparatus 100, not only the maximum value SVmax or the minimum value SVmin of the second reference voltage values SVijk after the temperature correction is changed, but each of the second reference voltage values SVijk after the temperature correction is multiplied by a same value that is smaller than 1 (one). With this configuration, it is possible to prevent the density of the image on the print from being greatly changed partially.

In addition, generally, a plurality of different types of sheets S can be stored in the sheet storage portion 2. The plurality of types include glossy paper, matte paper, and plain paper. Since moisture contained in the ink droplet permeates the sheet S with a different permeation level depending on the type of the sheet S, the coloring material density of the ink on the sheet S is different for each type. As a result, even if conditions other than the type are the same, the density of the image on the print is different depending on the type of the sheet S.

In view of the above, the first reference voltage values FVijk that are obtained by executing the process shown in FIG. 7 for each type of sheet S, are stored in the first storage portion 46A. Similarly, a plurality of sets of voltage values V1 to V3 and a plurality of measurement values D1*ijk* to D3*ijk* that are obtained by executing the process for each type of sheet S, are stored in the second storage portion 46B.

Figure 14:
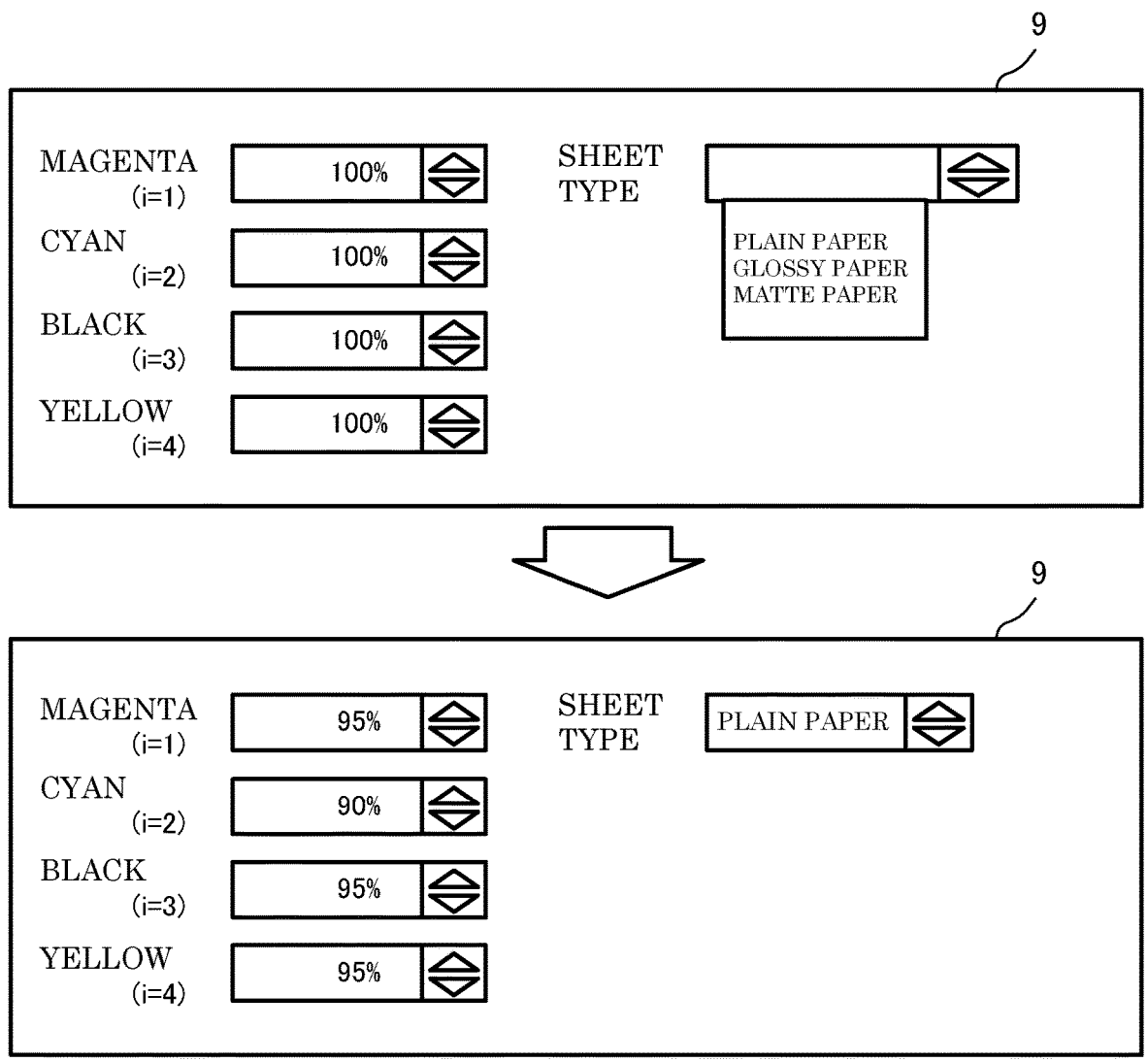
FIG. 14 is a schematic diagram showing a third example of the setting screen displayed on the operation/display portion shown in FIG. 4.

When the user changes the image density, a setting screen shown in FIG. 14 is displayed on the operation/display portion 9. As shown in FIG. 14, on the operation/display portion 9, the user specifies a ratio to the first target value FDij for each color, while specifying a sheet type.

The operation/display portion 9 transmits, to the control portion 8, operation data for specifying the sheet type, in addition to operation data for specifying the ratio for each color. During the process for changing the image density, the control portion 8, in step S41 of FIG. 15, generates type information indicating the sheet type, in addition to the ratio information indicating the ratio, based on the operation data, and transmits the generated information to each head control portion 46 in the head unit 41 of the corresponding color.

Upon receiving the ratio information and the sheet type information (step S42), each head control portion 46 functions as the voltage value calculating portion 46C. In a similar manner to the step S23, each head control portion 46 derives the second target value SDi for the corresponding color (step S43). Each head control portion 46 further reads, onto the RAM, the voltage values V1 to V3 and the measurement values D1*ijk*, D2*ijk* and D3*ijk* (k=1, 2, 3, 4) corresponding to the sheet type, from the second storage portion 46B of the head control portion 46 itself (step S43). Thereafter, each head control portion 46 executes the same processes as steps S24 to S33.

Figure 15:
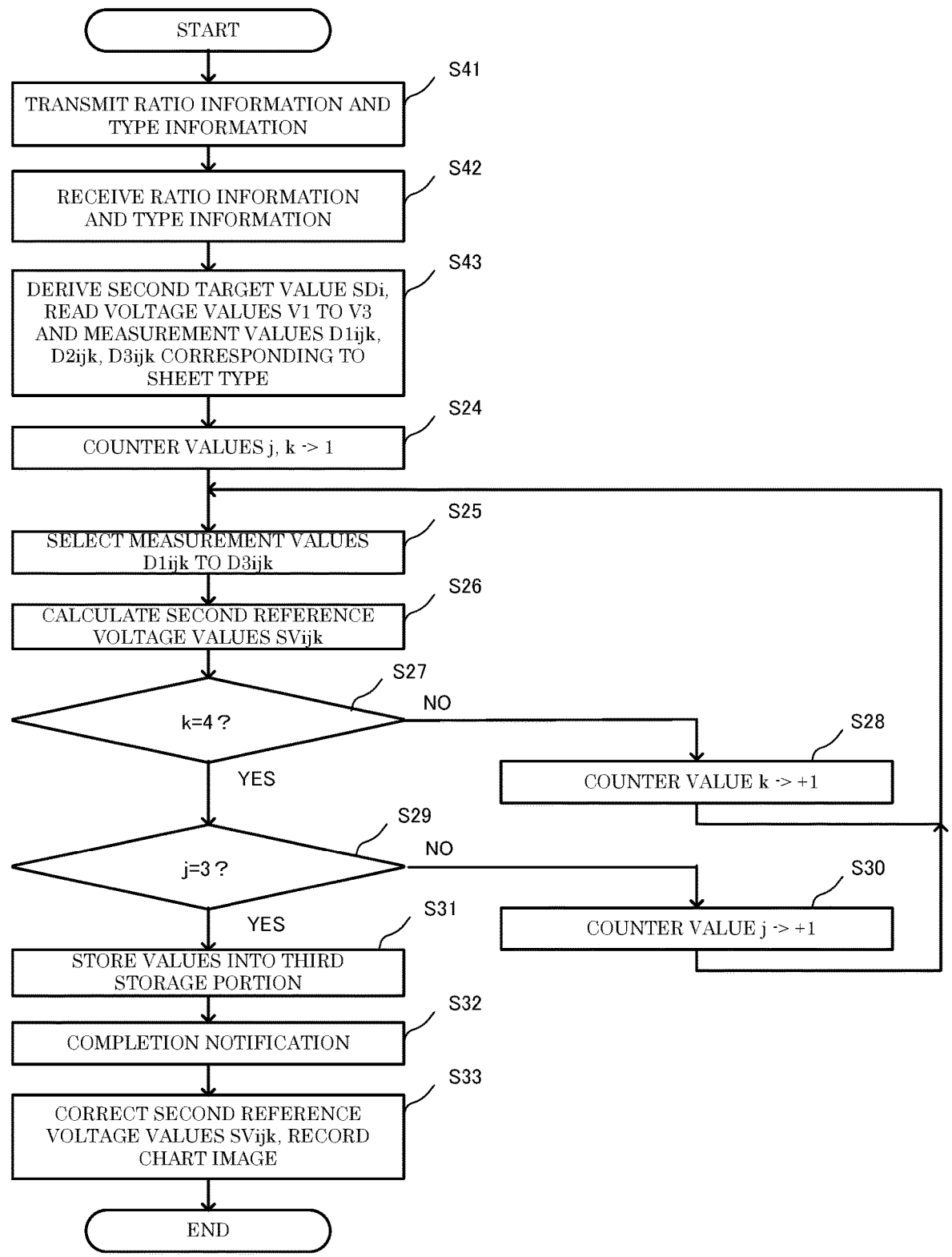
FIG. 15 is a flowchart showing a procedure of a modification of the image density changing process executed by the control portion and the head control portion shown in FIG. 4.

According to the process shown in FIG. 15, it is possible to obtain an appropriate image density for each of the sheet types.

In addition, sheets S of different material qualities, as well as sheets S of different types, have different permeation levels. As a result, even if conditions other than the permeation level are the same, the density of the image on the print is different depending on the permeation level. In view of this, the first reference voltage values FVijk that are obtained for each permeation level of sheet S, may be stored in the first storage portion 46A, and a plurality of sets of voltage values V1 to V3 and measurement values D1$ijk$ to D3$ijk$ that are obtained for each permeation level of sheet S, may be stored in the second storage portion 46B.

When the user changes the image density, the operation/display portion 9 transmits, to the control portion 8, operation data for specifying the permeation level, in addition to operation data for specifying the ratio for each color. The control portion 8 generates permeation level information indicating the permeation level as well as the ratio information based on the operation data, and transmits the generated information to each head control portion 46 in the head unit 41 of the corresponding color. Each head control portion 46 derives the second target value SDi based on the ratio information, and obtains the second reference voltage values SVijk based on the second target value SDi and the permeation level information.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A recording head unit comprising:
a plurality of ink ejection portions each configured to eject ink droplets based on a driving voltage;
a first storage portion configured to store, in advance, a plurality of first reference voltage values respectively for the plurality of ink ejection portions, the plurality of first reference voltage values corresponding to a predetermined first image density value;
a second storage portion configured to store, in advance, a plurality of voltage values that are different from each other, and a plurality of measurement values that indicate image densities respectively corresponding to the plurality of voltage values;
a voltage value calculating portion configured to, at a predetermined change timing for changing image density, calculate a plurality of second reference voltage values respectively for the plurality of ink ejection portions based on the plurality of voltage values and the plurality of measurement values, the plurality of second reference voltage values corresponding to a second image density value that is different from the first image density value; and
a voltage switching portion configured to switch driving voltages that are applied to the ink ejection portions, from driving voltages having the first reference voltage values to driving voltages having the second reference voltage values.

2. The recording head unit according to claim 1, wherein an upper-limit value and a lower-limit value of the driving voltages are determined in advance, and
when at least one of the plurality of second reference voltage values respectively for the plurality of ink ejection portions is higher than the upper-limit value or lower than the lower-limit value, the voltage value calculating portion changes the plurality of second reference voltage values to values that are each equal to or lower than the upper-limit value and equal to or higher than the lower-limit value.

3. The recording head unit according to claim 2, wherein
when at least one of the plurality of second reference voltage values respectively for the plurality of ink ejection portions is higher than the upper-limit value, the voltage value calculating portion changes the plurality of second reference voltage values by multiplying a value that is obtained by dividing the upper-limit value by a maximum value of the plurality of second reference voltage values, by each of the plurality of second reference voltage values, and
when at least one of the plurality of second reference voltage values respectively for the plurality of ink ejection portions is lower than the lower-limit value, the voltage value calculating portion changes the plurality of second reference voltage values by multiplying a value that is obtained by dividing the lower-limit value by a minimum value of the plurality of second reference voltage values, by each of the plurality of second reference voltage values.

4. The recording head unit according to claim 1, wherein
the voltage value calculating portion, upon receiving ratio information that indicates a ratio to the first image density value, derives the second image density value based on the ratio information, and then calculates the plurality of second reference voltage values corresponding to the second image density value.

5. The recording head unit according to claim 1, wherein
the second storage portion stores, in advance, the plurality of voltage values and the plurality of measurement values for each type of sheet, and
the voltage value calculating portion calculates the plurality of second reference voltage values corresponding to the second image density value, based on the plurality of voltage values and the plurality of measurement values corresponding to a type of sheet on which an image is to be recorded.

6. The recording head unit according to claim 1, wherein
the second storage portion stores, in advance, the plurality of voltage values and the plurality of measurement values for each permeation level of sheet, the permeation level indicating a level of permeation of moisture contained in the ink droplet to the sheet, and
the voltage value calculating portion calculates the plurality of second reference voltage values corresponding to the second image density value, based on the plurality of voltage values and the plurality of measurement values corresponding to a permeation level of a sheet on which an image is to be recorded.

7. An inkjet recording apparatus comprising:
a plurality of ink ejection portions each configured to eject ink droplets based on a driving voltage;
a first storage portion configured to store, in advance, a plurality of first reference voltage values respectively for the plurality of ink ejection portions, the plurality of first reference voltage values corresponding to a predetermined first image density value;
a second storage portion configured to store, in advance, a plurality of voltage values that are different from each other, and a plurality of measurement values that indicate image densities respectively corresponding to the plurality of voltage values;

a voltage value calculating portion configured to, at a predetermined change timing for changing image density, calculate a plurality of second reference voltage values respectively for the plurality of ink ejection portions based on the plurality of voltage values and the plurality of measurement values, the plurality of second reference voltage values corresponding to a second image density value that is different from the first image density value; and a voltage switching portion configured to switch driving voltages that are applied to the ink ejection portions, from driving voltages having the first reference voltage values to driving voltages having the second reference voltage values.

8. The inkjet recording apparatus according to claim 7, wherein an upper-limit value and a lower-limit value of the driving voltages are determined in advance, and when at least one of the plurality of second reference voltage values respectively for the plurality of ink ejection portions is higher than the upper-limit value or lower than the lower-limit value, the voltage value calculating portion changes the plurality of second reference voltage values to values that are each equal to or lower than the upper-limit value and equal to or higher than the lower-limit value.

9. The inkjet recording apparatus according to claim 8, wherein when at least one of the plurality of second reference voltage values respectively for the plurality of ink ejection portions is higher than the upper-limit value, the voltage value calculating portion changes the plurality of second reference voltage values by multiplying a value that is obtained by dividing the upper-limit value by a maximum value of the plurality of second reference voltage values, by each of the plurality of second reference voltage values, and when at least one of the plurality of second reference voltage values respectively for the plurality of ink ejection portions is lower than the lower-limit value, the voltage value calculating portion changes the plurality of second reference voltage values by multiplying a value that is obtained by dividing the lower-limit value by a minimum value of the plurality of second reference voltage values, by each of the plurality of second reference voltage values.

10. The inkjet recording apparatus according to claim 7, wherein the voltage value calculating portion, upon receiving ratio information that indicates a ratio to the first image density value, derives the second image density value based on the ratio information, and then calculates the plurality of second reference voltage values corresponding to the second image density value.

11. The inkjet recording apparatus according to claim 7, wherein the second storage portion stores, in advance, the plurality of voltage values and the plurality of measurement values for each type of sheet, and the voltage value calculating portion calculates the plurality of second reference voltage values corresponding to the second image density value, based on the plurality of voltage values and the plurality of measurement values corresponding to a type of sheet on which an image is to be recorded.

12. The inkjet recording apparatus according to claim 7, wherein the second storage portion stores, in advance, the plurality of voltage values and the plurality of measurement values for each permeation level of sheet, the permeation level indicating a level of permeation of moisture contained in the ink droplet to the sheet, and the voltage value calculating portion calculates the plurality of second reference voltage values corresponding to the second image density value, based on the plurality of voltage values and the plurality of measurement values corresponding to a permeation level of a sheet on which an image is to be recorded.

* * * * *